United States Patent [19]

King, Sr.

[11] Patent Number: 4,702,270

[45] Date of Patent: Oct. 27, 1987

[54] DISPERSAL MEMBER

[76] Inventor: Lloyd H. King, Sr., 5222 Green Farms Rd., Edina, Minn. 55436

[21] Appl. No.: 830,673

[22] Filed: Feb. 18, 1986

Related U.S. Application Data

[63] Continuation-in-part of Ser. No. 798,184, Nov. 18, 1985, abandoned.

[51] Int. Cl.⁴ ............................................. B01D 11/00
[52] U.S. Cl. ..................................... 137/268; 422/265
[58] Field of Search .............................. 137/268, 625.3; 422/265

[56] References Cited

U.S. PATENT DOCUMENTS

| | | | |
|---|---|---|---|
| 2,556,308 | 6/1951 | Weatherhead | 137/625.3 X |
| 3,598,536 | 8/1971 | Christensen | 422/264 B |
| 3,607,103 | 9/1971 | Kiefer | 422/264 B |
| 3,677,711 | 7/1972 | Bond | 422/264 B |
| 4,241,025 | 12/1980 | Grayson | 422/263 |

Primary Examiner—Alan Cohan
Attorney, Agent, or Firm—Jacobson and Johnson

[57] ABSTRACT

A floating dispersal member for controllably dispersing a material into a fluid wherein the dispersal member contains a compartment to hold a dispersant and a visual indicator to alert a person to when the dispersant is dissolved. In another embodiment the floating dispersal member includes a flotation compartment that holds the dispersal member in an upright condition when there is a dispersant in said dispersal member and a weight which flips the dispersal member in an end-for-end condition when the dispersant is dissolved in said dispersal member.

15 Claims, 20 Drawing Figures

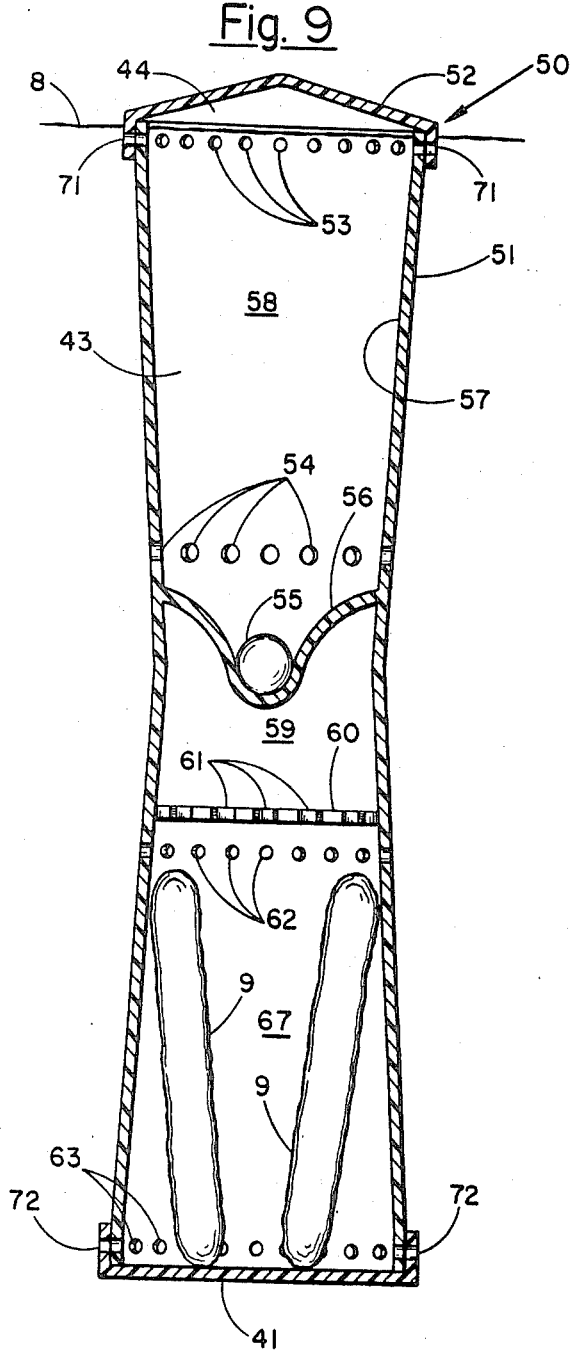
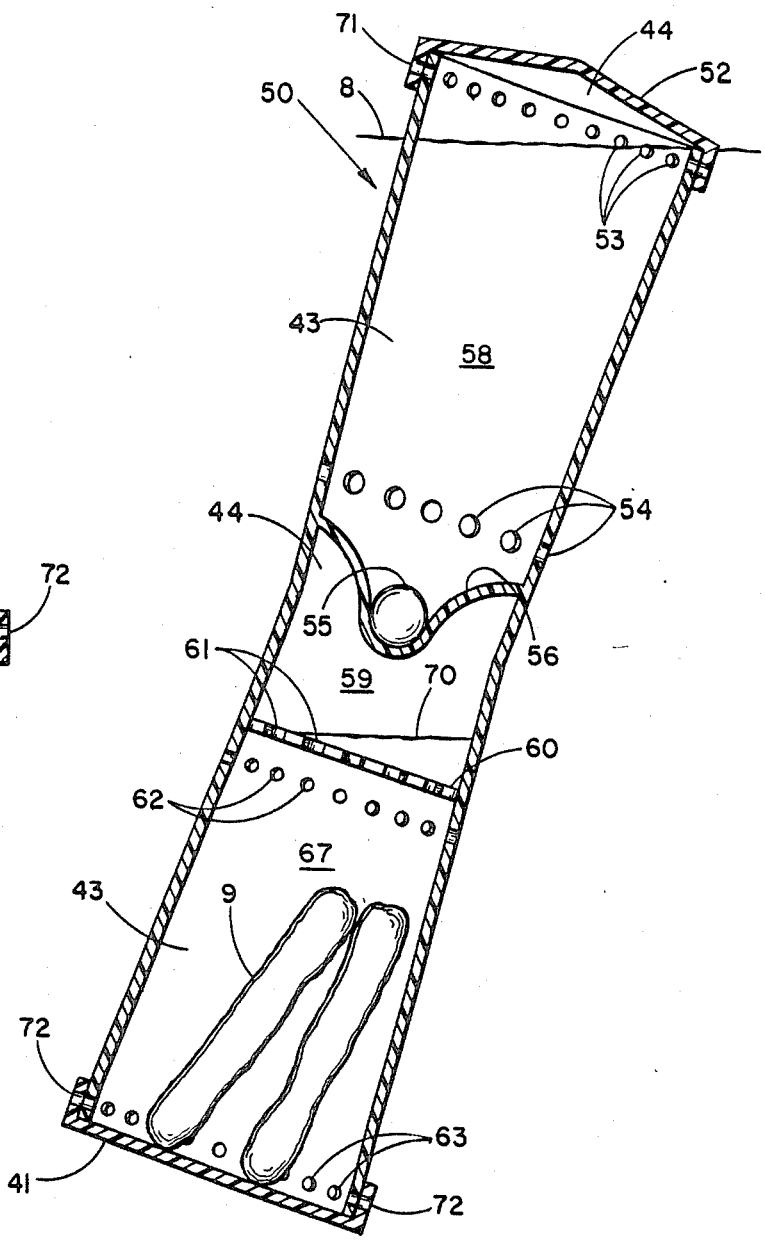
Fig. 9
Fig. 10

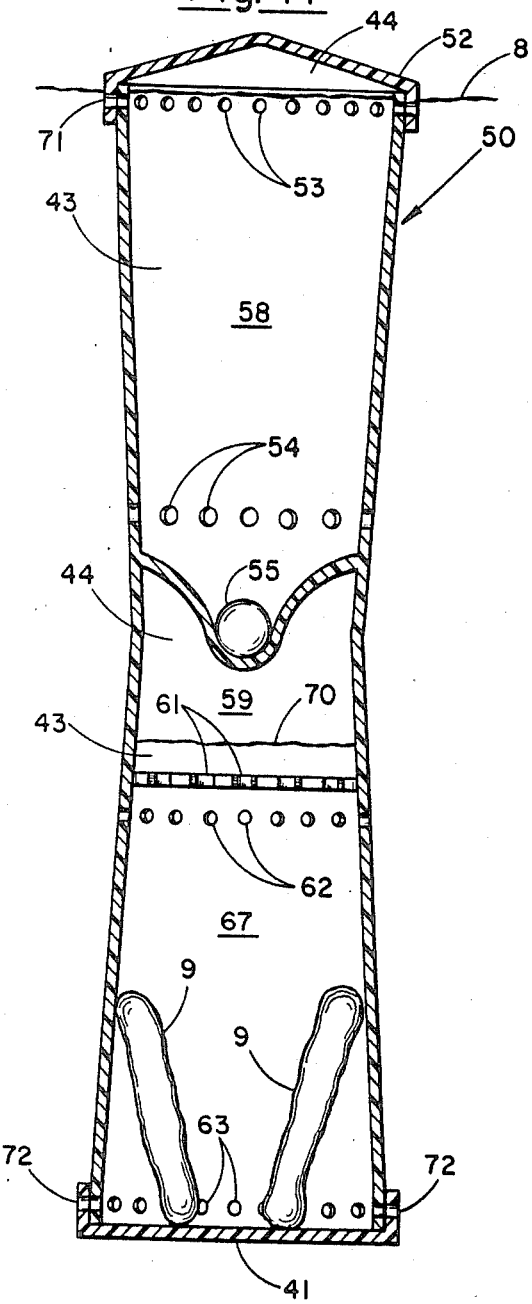
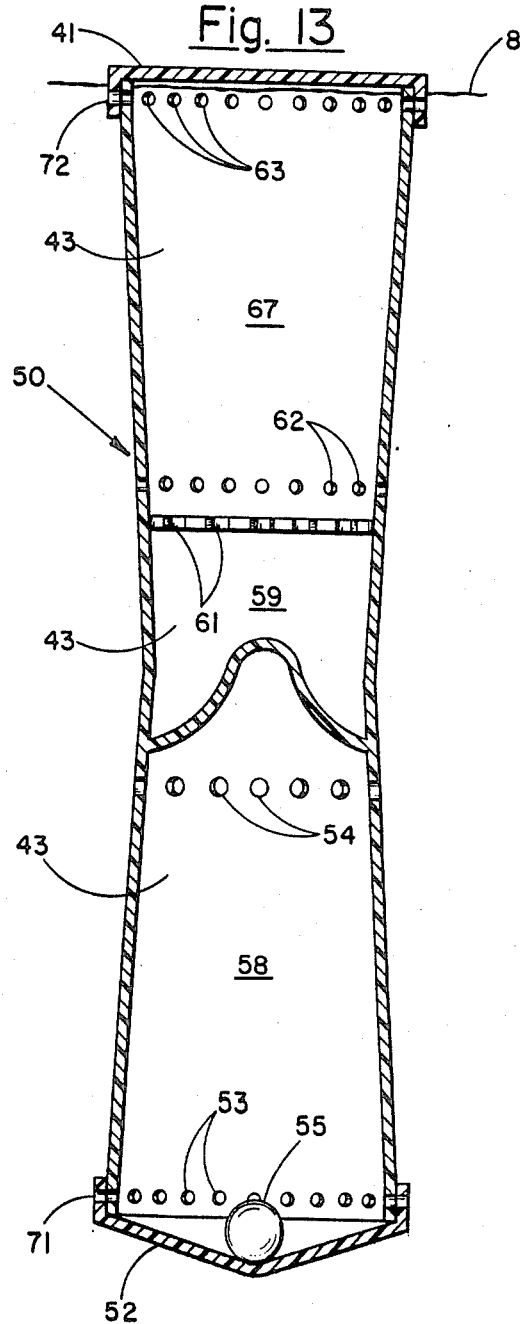
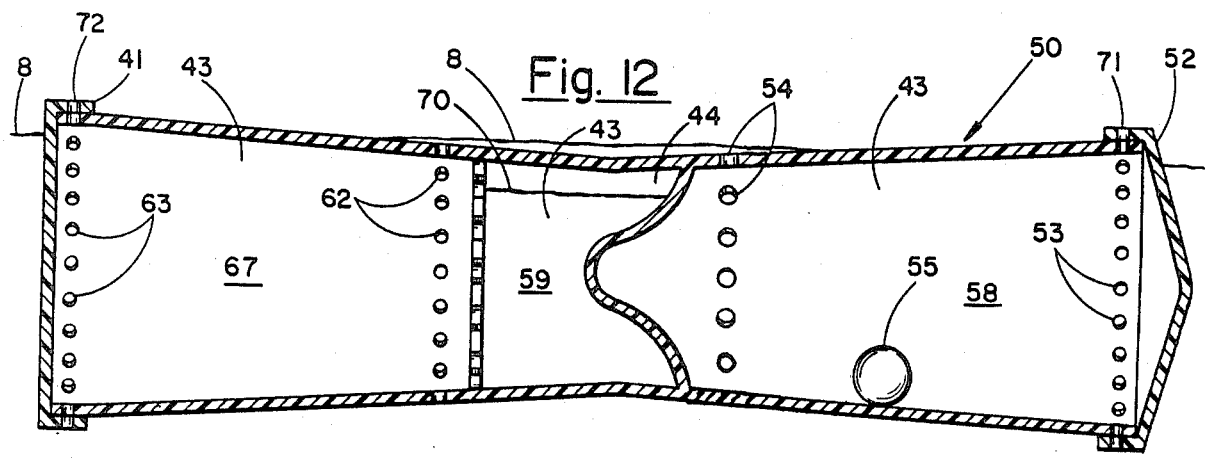

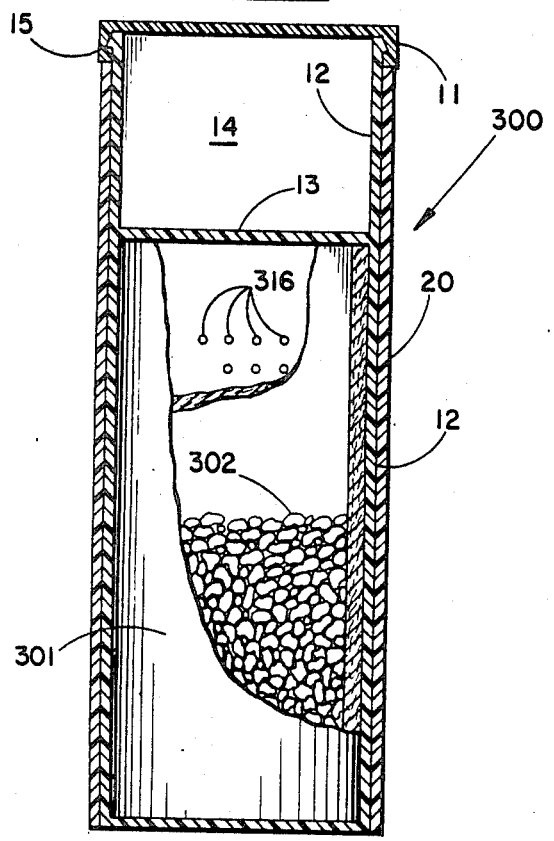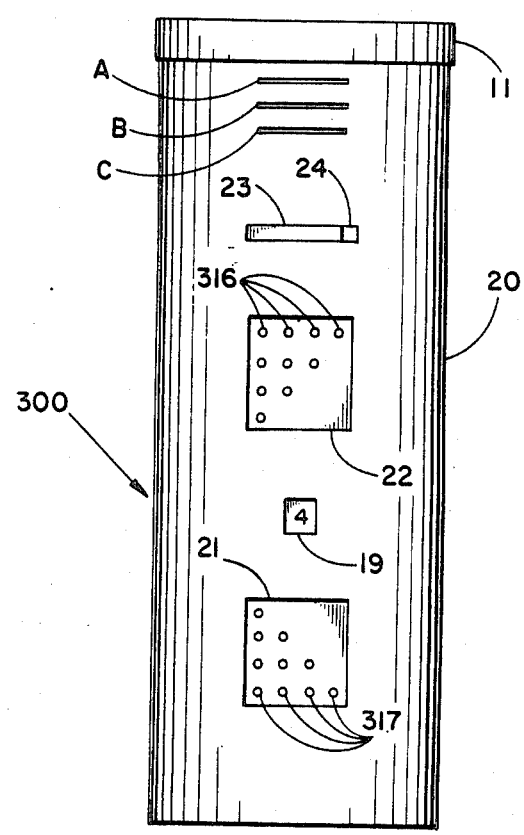

DISPERSAL MEMBER

CROSS REFERENCE TO RELATED APPLICATION

This application is a continuation-in-part of my corresponding U.S. patent application Ser. No. 798,184, filed Nov. 18, 1985 titled "DISPERSAL MEMBER", now abandoned.

BACKGROUND OF THE INVENTION

1. Field of the Invention

This invention relates to apparatus for controllably dispensing fluid soluble materials into a fluid.

2. Description of the Prior Art

The concept of dissolving solid materials and controllably releasing the material into a fluid stream such as with the bromination or chlorination of swimming pools or spas is well known. Typical of such dispersal valves are those shown in my U.S. Pat. No. 4,249,562 and U.S. Pat. No. 4,270,565.

The present invention provides an improvement to prior art systems to allow a user to place the dispersal member directly into the pool, spa or the like while permitting the user to control the amount of material dispersed. The dispersal member includes a means for alerting a user when the dispersant has been dissolved.

Typical of the prior art devices for dispensing chemicals into a spa or hot tub or the like is the spa BROM ® minipak which comprises a non-floating plastic container with a set of holes to let water contact the bromine sticks located in the container. The disadvantage of such devices are that they do not float and there is no way for a user to control the bromine release within acceptable limits. Typically the units are usually tied to the tank or placed in a skimmer basket. Besides having the disadvantage of providing no control of the release rate of bromine, these units must first be found to check to see if the units are still working.

Another type of device shown for dispensing bromine into a spa or other tub or the like is the A. J. spa floater which has a floating container with a compartment for holding bromine sticks. The compartment contains a plurality of holes of uniform size to permit fluid to contact the bromine sticks in the compartment. While this unit can be more readily located since it floats, it nevertheless does not permit one to either adjust the rate of dispersal of bromine nor does it permit one to obtain an indication of when the unit is empty.

A further disadvantage involves the incidental use of such device. Oftentimes people in hot tubs or spas will, in a playful mood, begin tossing around the spa floater unit. Since the spa floater is made of heavy materials, it can easily injure someone if one is accidentally hit with the spa floater. The spa floater also has the disadvantage that the dispersant compartment is not childproof. Consequently, a child could open the dispersant compartment and come in contact with the toxic chemicals contained therein.

DESCRIPTION OF THE DRAWINGS

FIG. 9 is an alternate embodiment of a floating dispersal member;

FIG. 10 shows floating dispersal member of FIG. 9 in a slightly tilted position;

FIG. 11 shows the floating dispersal member of FIG. 9 in a vertical floating position;

FIG. 12 shows the floating dispersal member of FIG. 9 in a horizontal floating position;

FIG. 13 shows the floating dispersal member of FIG. 9 in an upside-down position;

FIG. 19 is a partially cut-away, cross-sectional front elevation view of another embodiment of my floating dispersal member.

FIG. 20 is a front elevation view of the embodiment of FIG.19 and shows my floating dispersal member in a fully open position.

Referring to the drawings, FIGS. 1 through 5 illustrate a floating dispersal member for dispersing materials such as bromine or chlorine into a tank, a spa or the like. The embodiment 10 shown in FIGS. 1, 2 and 3 have vertically spaced float lines A, B, and C as visual indicators to show when dispersal member 10 is empty while the embodiment 30 shown in FIGS. 4 and 5 has a popup visual indicator 38 to show when the dispersal member 30 is empty.

Typically, my floating dispersal members include a dispersant compartment for holding a stick dispersant such as a bromine or chlorine disinfectant and a flotation compartment to permit the dispersal member and dispersant to float in a substantially submerged position.

Figure 1:
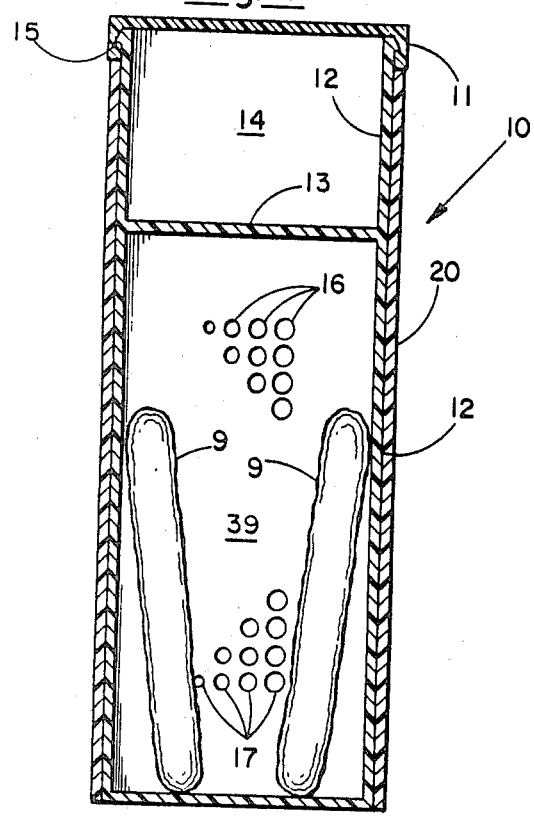
FIG. 1 is a cross-sectional front elevation view of my floating dispersal member.
Figure 2:
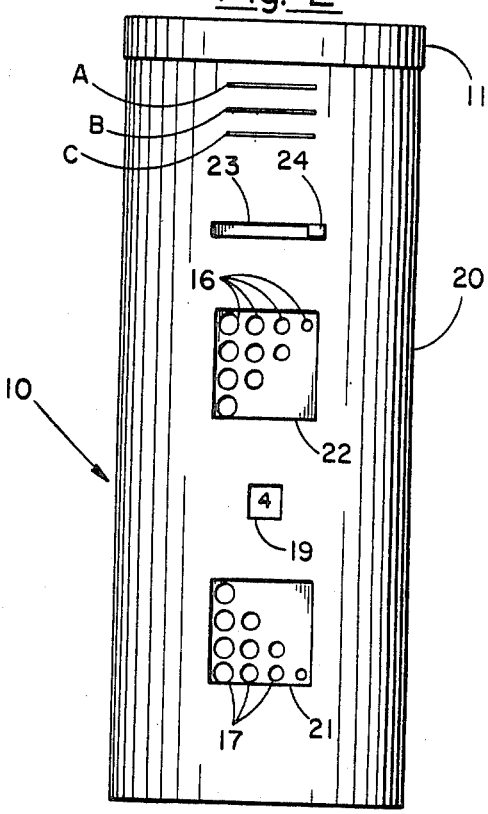
FIG. 2 is a front elevation view of my floating dispersal member in a fully open position.
Figure 3:
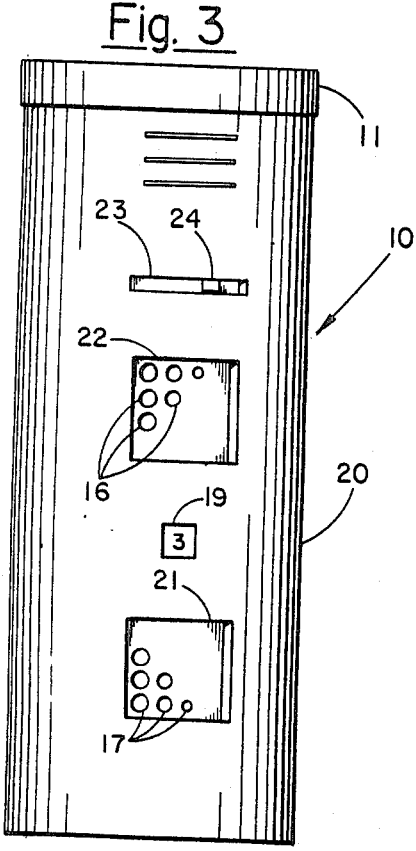
FIG. 3 is a front elevation view of my floating dispersal member in a slightly closed position.

Referring to FIGS. 1 through 3, reference number 10 generally identifies my floating dispersal member with marked visual indicators. Flotating dispersal member 10 comprises an outer rotatable cylindrical housing 20 which is rotatable with respect to an inner cylindrical housing 12. Typically, housing 20 and housing 12 are made of a lightweight plastic or the like. Housing 12 has a disc-shaped cross-member 13 that separates housing 12 into an upper airtight chamber or compartment 14 and a lower dispersant chamber or compartment 39 containing a pair of solid dispersants 9 therein. Located on top of chamber 14 is a snap-on cap 11 which has a circular notch 15 for engaging a similar circular notch on housing 12 to thereby provide an airtight flotation compartment 14. Compartment 14 has sufficient size to provide buoyancy to float dispersal member 10 with dispersant stick 9 in a substantially submerged position.

Located on the top portion of the lower chamber 39 is an upper set of spaced holes 16 and a lower set of spaced holes 17. FIG. 1 shows an identical set of spaced holes 16 and 17 located on the back side of dispersal member 12 while FIGS. 2 and 3 show a set of spaced holes 16 and 17 which are located on the front side of dispersal member 12. FIG. 2 illustrates how the set of holes 16 and 17 are arranged to match up with larger openings 21 and 22 which are located on the front of rotatable housing 20 and similar openings (not shown) which are located in the back of rotatable housing 20. It should be noted that while the larger openings 21 and 22 are located on opposite sides of housing 20 the relationship of the back holes 16 and 17 to back openings 21 and 22 are identical to the relationship shown in FIG. 2.

Located toward the top of housing 20 is an elongated guide slot 23 for a protruding member 24 which is affixed to inner cylinder housing 12 to permit one to open or close dispersal member 10. FIG. 2 shows dispersal member 10 in the open position with ten openings uncovered. In the open position fluid flows in the openings around dispersant 9. As the fluid flows around dispersant 9, it dissolves the dispersant and carries the dispersant back into the tank through either holes 16 or 17. Housing 20 contains an indicator opening 19. FIG. 2 shows the unit is in the fully open position by exposing the numeral 4 through opening 19.

FIG. 3 illustrates housing 20 in a partially closed position. Housing 20 can be rotated by moving member 24 from the end of slot 23. In the partially open position (FIG. 3) only 6 holes are visible through openings 22 or 21 and their opposite counterpart openings (not shown). An indicator opening 19 shows the unit is in a partially open position by exposing the numeral 3 through opening 19 while FIG. 2 shows dispersal member in the completely open position with numeral 4 exposed through opening 19. Further rotation of housing 20 with respect to housing 12 can completely cover holes 16 and 17 thereby preventing any fluid from coming into contact with the dispersant in dispersant chamber 39.

While an air chamber 14 provides buoyancy for dispersal member 10 other flotation means such as lightweight plastics or cork could be used to provide buoyancy for my floating dispersal member 10. To provide a visual indication of whether dispersal member 10 is empty or full the float lines A, B, and C indicate the full or empty condition of dispersal member 10. For example, if dispersant is completely dissolved dispersal member 10 would float with line C at the water level while if dispersal member 10 was full of dispersant, dispersal member 10 would float with line A at the water line.

Figure 4:
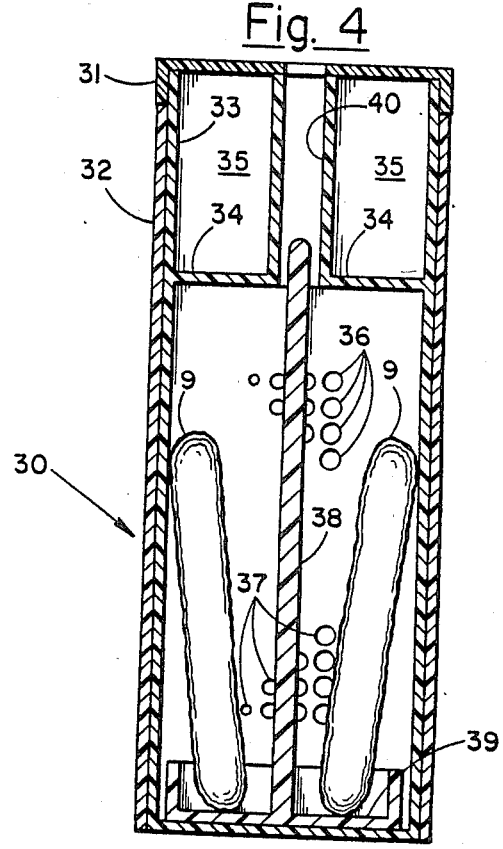
FIG. 4 is a cross-sectional front elevation view of another embodiment of a floating dispersal member.
Figure 5:
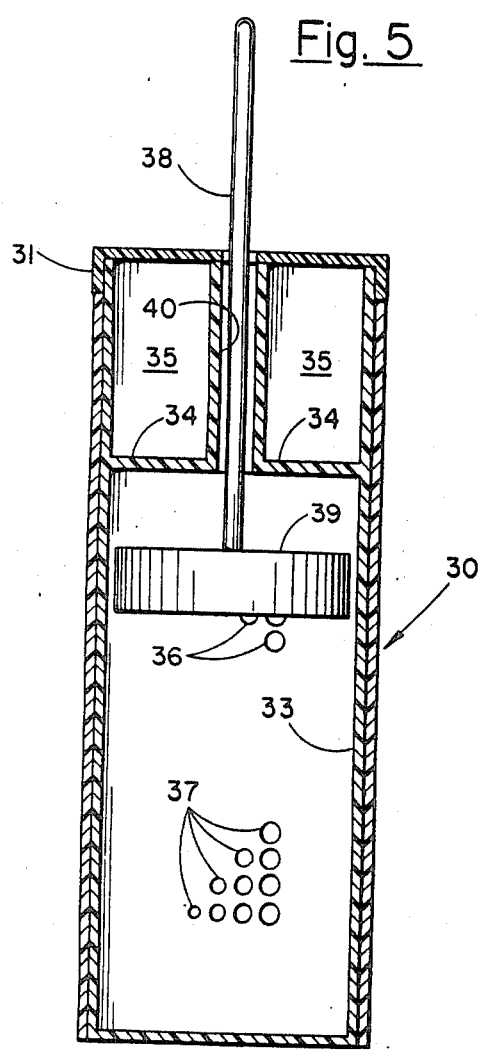
FIG. 5 is a cross-sectional front elevation view of the dispersal member of FIG. 4 in the empty position.

Referring to FIGS. 4 and 5 there is shown alternate embodiment of my floating dispersal member 30 which has a popup visual indicator to alert the user when the dispersant is dissolved. Dispersal member 30 is similar to dispersal member 10. Dispersal member 30 has an outer rotatable housing 32 and an annular flotation chamber 35 formed by an annular cap 31 covering an annular member 34 and housing 33. A passage 40 extends through the center of annular chamber 35. A top end of popup visual indicator 38 extends into passage 40. Similar to dispersal member 10, dispersal member 30 contains a set of front (not shown) and rear fluid openings 36 in the upper portion and a set of front (not shown) and rear fluid openings 37 in the lower portion. Solid dispersant sticks 9 such as bromine or chlorine are located in a basket 39 that connects to popup visual indicator 38. FIG. 4 shows dispersal member in the full position while FIG. 5 shows the dispersal member in the empty condition.

To provide a popup visual indicator member 39 is made of material which is lighter than the fluid it is used in, for example, if the dispersal member 30 is used in water, basket 39 and indicator 38 have a density less than water so basket 39 and indicator 38 float to the buoyancy of basket 39 and indicator 38 causes the indicator to float upward and extend out of the top of dispersal member 30 once the dispersant 9 dissolves. Dispersal member 30 is identical to the dispersal member 10 with respect to the adjustability to allow fluids in and out of dispersant. However, dispersal member 30 provides the user with a popup visual indicator when the unit is empty while the dispersal member 10 utilizes markings on the side of the dispersal member which alert a party as to whether the unit is empty or full.

Figure 7:
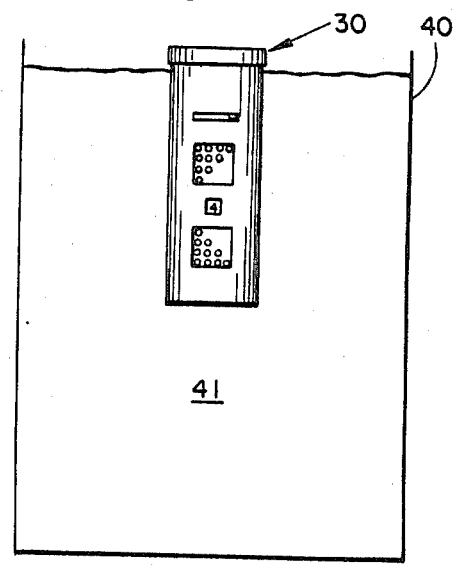
FIG. 7 is a partial schematic view of a full floating dispersal member in a tank of water.
Figure 8:
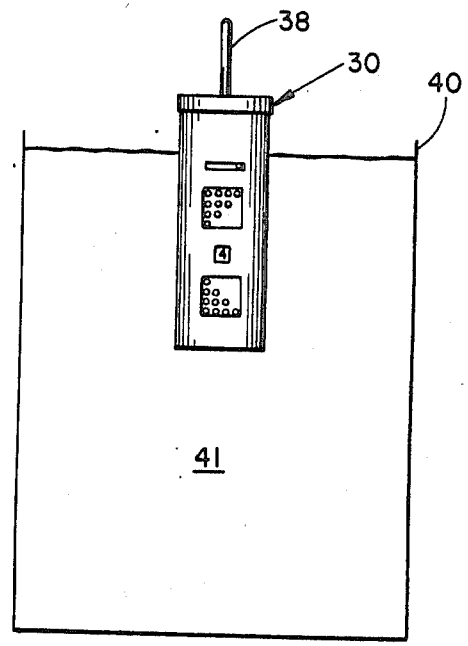
FIG. 8 is a partial schematic view of an empty floating dispersal member in a tank of water.
Figure 14:
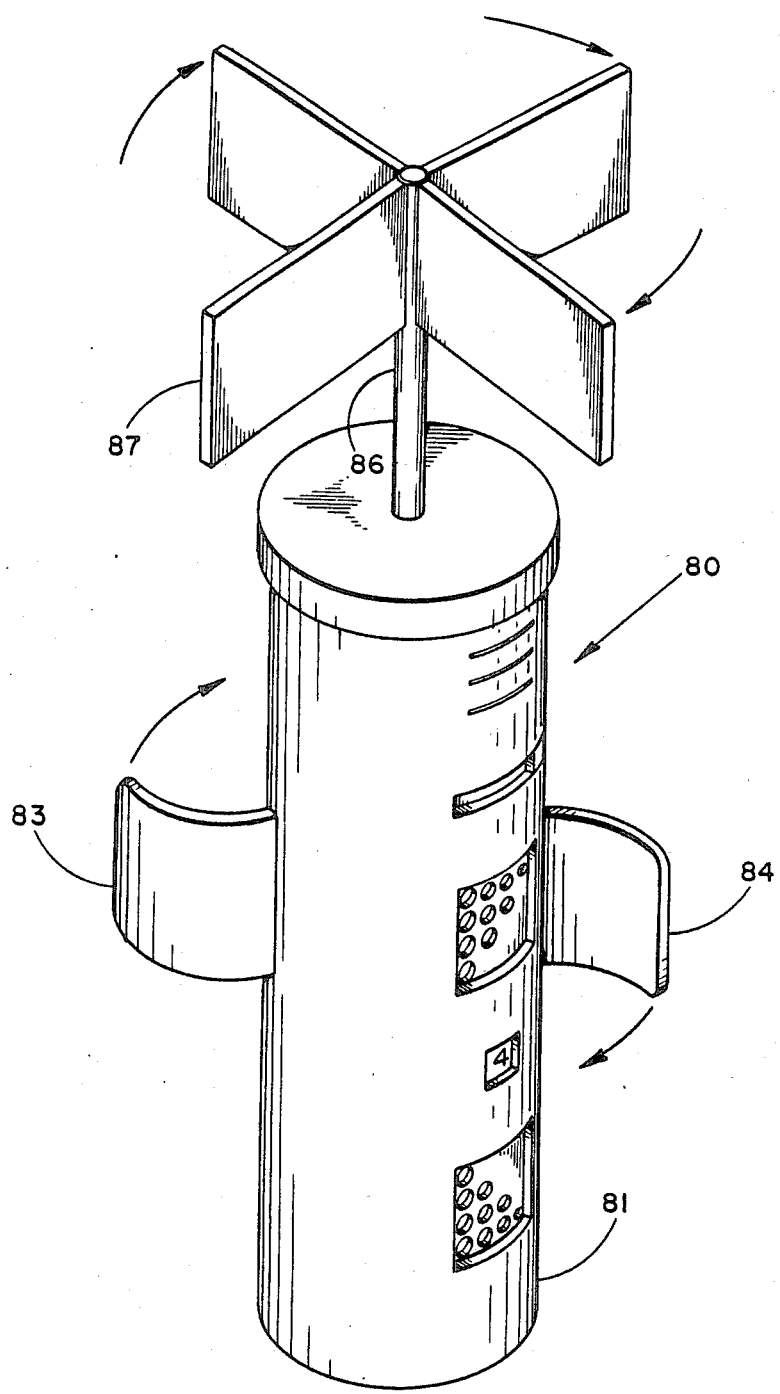
FIG. 14 shows an alternate embodiment of a floating dispersal member having windvanes and scoops for forcing fluid through the dispersal member.
Figure 15:
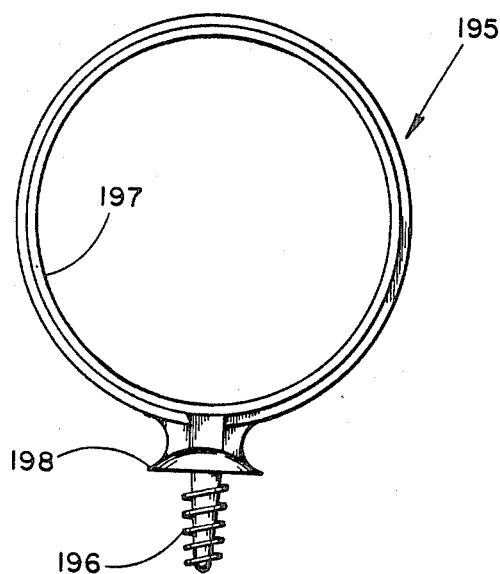
FIG. 15 is a top view of a dispersal member holder.
Figure 16:
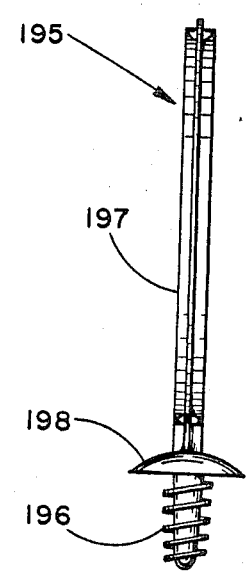
FIG. 16 is a side view of the dispersal member holder of FIG. 15.
Figure 17:
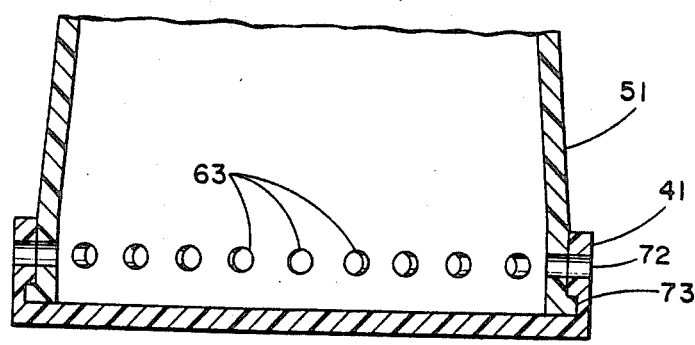
FIG. 17 shows a detail view of an adjustable inlet on a floating dispersal member.
Figure 18:
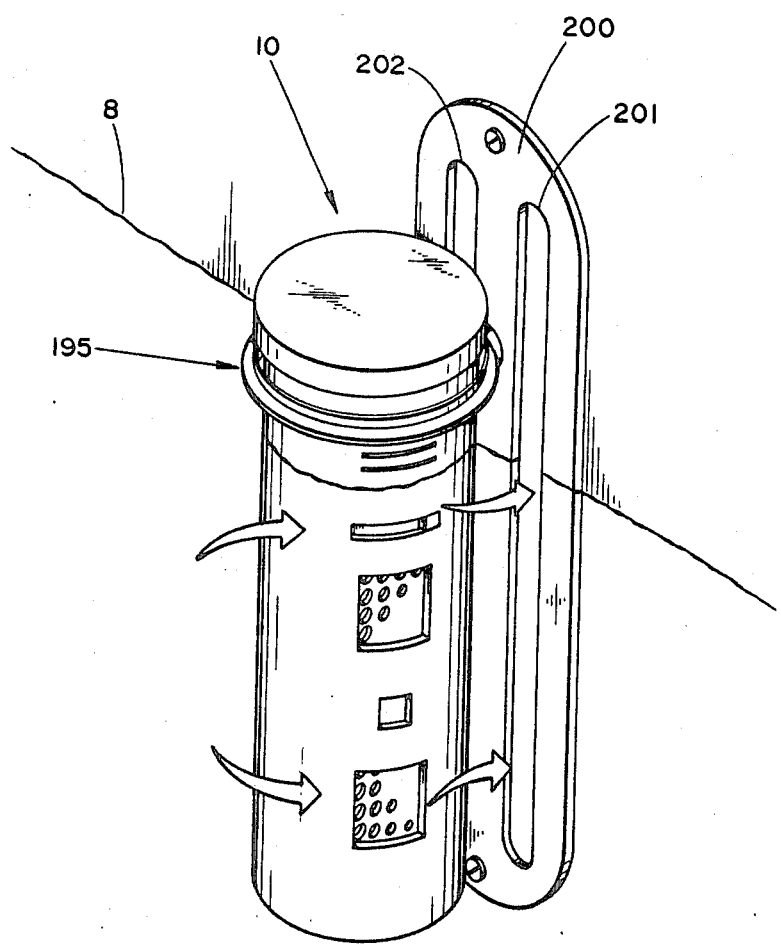
FIG. 18 shows a dispersal member mounted in a skimmer.

FIGS. 7 and 8 illustrate the dispersal member 30 in its normal vertical floating position in tank 40. FIG. 7 also illustrates the vertical flotation position of dispersal member 30 as the dispersant is being dissolved and dispersed into tank 40. In contrast, FIG. 8 illustrates the flotation position of dispersal member 30 when the dispersant is completely dissolved. Note, popup visual indicator 38 protrudes upward through the top of dispersal member 30 to alert the user that the dispersant is dissolved.

Figure 6:
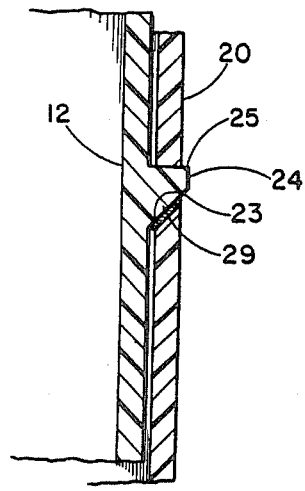
FIG. 6 shows a detail cross-sectional of a portion of my floating dispersal member.

To illustrate the assembly of the outer cylindrical housing to the inner cylindrical housing of my dispersal members, reference should be made to FIGS. 6, 2 and 3. Located on inner cylindrical housing 12 of dispersal member is a member 24 which protrudes through slot 23. Member 24 has an angled or beveled side 29 and a right angle side 25 with portions of both sides 25 and 29 of member 24 projecting through opening 23. The angled side 25 on member 24 allows cylindrical housing 20 which is typically made of rigid yet flexible material such as a polymer plastic to be slipped up and over a similar cylindrical housing 12 which is also made of rigid yet flexible material such as plastic to thereby permit assembly of my dispersal valve. Once assembled, member 24 can be rotated from outside housing 20. The rotational adjustment of housing 12 with respect to housing 20 permits one to adjust the flow openings.

In the embodiment shown in FIGS. 1–8 the openings 16 and 17 and 36 and 37 are generally of unequal size to provide greater graduation than equal size holes. The set of lower holes are located with the larger number of openings located on the lower side of dispersal member. It is believed that such location aids the fluid mixing since the fluid mixed with the dispersant is generally heavier than the fluid and flows out the lower opening in greater concentration. While the means for permitting fluid to flow in and out of dispersal member are shown as holes, membranes could be used as the means to permit fluid flow in and out of the dispersal member. Membranes are usually more suitable if the dispersant is in liquid form.

In addition, with some dispersant there is a binder to hold or encapsulate the dispersant. My invention is well adapted for retaining the binder. As the binder may cause unsightly residue in the system, the dispersant and the binder can be placed inside a filter bag which can be inserted into my dispersal member.

If desired some type of an eye can be attached to my dispersal member 10 to hold dispersal member in a specific location in the fluid.

One of the features of my dispersal member is that the openings to permit ingress and egress of fluid are generally spaced from the bottom of the compartment to create a cup-like container. This cup-like container enables one to remove the dispersal member from a container and set the dispersal member on a shelf or the like without concern that the dispersant will flow onto the shelf, i.e., the bottom or cup portion of the dispersal member acts to catch material that may continue to dissolve or exude from the dispersant.

FIGS. 9 through 13 show another embodiment of a floating flippable dispersal member 50 which flips over after the dispersant dissolves. FIG. 9 shows flippable dispersal member 50 in the normal full floating condition with respect to a fluid 8. Dispersal member 50 contains a lower dispersant chamber or compartment 67 which has a plurality of upper opening 62 and a plurality of lower openings 63. In the full condition dispersal member 50 floats in the upright or vertical condition as shown in FIG. 9. Dispersal member 50 includes a lower rotatable cap 41 that fits on the lower end of dispersal member 50 and is rotatable to adjust the flow through area of the openings in lower dispersant chamber or compartment 67. A more detail of the rotational feature is shown in FIG. 17 which shows a circular notch 73 that extends around the periphery of member 41 to permit rotational engagement of member 41 with aspect to housing 51 to thereby permit one to open or close openings 63 through alignment or misalignment of holes 63 and 72.

Located in the middle of dispersal member 50 is an air flotation chamber 59 which has a plurality of small openings 61 located around the periphery of a disc member 60 which separates lower dispersant chamber 67 from air flotation chamber 59. Openings 61 are relatively small so as to slowly let air out and water into flotation chamber 59 during operation of dispersal member 50.

Located above air flotation chamber 59 is a top fluid chamber 58 which has a plurality of upper openings 53 and a plurality of lower openings 54. Chamber 58 generally diverges outward from chamber 57. Forming the bottom portion of chamber 58 is a generally concave housing or seat 56 having a round weight 55 such as a marble, ball or the like located in the seat of housing 56. Formed in the top portion of chamber 58 and dispersal member 50 is a convex top 52. A plurality of opening 53 and 54 permit fluid to flow into and out of chamber 58. In the full condition (FIG. 9) dispersal member 50 floats in almost a submerged condition. Note, the water line 8 which is very close to the top of dispersal member 50 and above openings 53 and 71. In the full condition shown in FIG. 9 the dispersal member chambers 67 is filled with fluid while chamber 58 is almost completely filled with fluid. Note flotation chamber 59 contains little or no fluid As the dispersant 9 dissolves the bottom of dispersal member becomes lighter causing the buoyancy forces to slightly tip dispersal member (see FIG. 10). As the dispersal member 50 tips slightly water seeps from dispersal chamber 67 into flotation chamber 59 through openings 61. The water in chamber 59 is illustrated by reference numeral 70. As the water enters floating chamber 59 it loses some of its buoyancy force which causes dispersal member 50 to tip back into the vertical position shown in FIG. 11.

FIG. 11 shows water 70 partial filling flotation chamber 59. The size and number of holes 61 are a matter of design to allow for the proper tipping action. For example, if the holes 61 are relatively large and numerous the unit will tip rather quickly but if the holes 61 are small, the unit will tip slowly. Typically, I have found an area of 0.25 square inches is sufficient to work with dispersant member 50 having an overall size and shape as shown in FIG. 9–13.

As the dispersant dissolves completely the buoyancy force of flotation chamber 59 tips dispersal member on the side as shown in FIG. 12. Note the water 8 substantially fills flotation chambers 59 while chambers 67 and also 58 continue to be substantially full of water. As dispersal member lays on its side in a horizontal position (FIG. 12) marble 55 rolls off the seat and on the downward sloping diverging wall 43 to end 52. When marble 55 approaches the right end of dispersal member 50 the weight of marble 55 causes end 52 dispersal member 50 to sink. FIG. 13 shows marble 55 on end 52 with the formed bottom section 41 located above the water line 8. Thus it will be appreciated that dispersal member 50 flips end-for-end when the dispersant has dissolved. Typically, a color, for example red, is placed on the bottom of section 41 to alert the operator that the dispersal member is out of dispersant. Dispersal member 50 is made from a buoyant material so that dispersal member 50 has sufficient buoyancy to support dispersal member 50.

FIG. 14 shows a variation of the invention for use in containers which enable the wind or water currents to rotate dispersal member 80 so that scoops 83 and 84 can force fluid through the upper openings in dispersal member thereby causing the dispersant to dissolve at a faster rate. Vanes 87 are attached to either the sides or in the form of a weather vane to a rod 86 which is rigidly attached to the top of dispersal member 80. Dispersal member 80 is identical to dispersal member 10 except for the aforementioned differences. In some instances it may be desired to mount the dispersal member in a skimmer or the like.

FIGS. 15 and 16 show a housing member 195 for holding a dispersal member such as 10 or 30 in a remote location such as in front of the skimmer. Member 195 contains a ring 197 for insertion of a dispersal member therein, a base 198 and a screw fastener 196 for attaching the side of a skimmer or the like. The advantage of using member 195 is that it holds dispersal member in a positive single location.

Referring to FIG. 18 there is shown my dispersal member 10 located in front of a skimmer. Member 195 holds dispersal member 10 in a vertical position in front of skimmer plate 200. Located in skimmer plate 200 are skimmer slots 201 and 202 for skimming fluid from the system. The location of the dispersal member adjacent skimmer ensures that there will be continual flow of fluid past and through the dispersal member 10.

One aspect of various systems is that the skimmers or the output jets have different flow rates. That is, the rate of flow of fluid past one skimmer may be different in one system than the other. With my invention I can adjust the openings in my dispersal member so that the proper amount of dispersant is dissolved into any particular system. For example, if a skimmer has a high water velocity past the skimmer, I can adjust the opening in my dispersal member to be almost in a closed state in order to ensure the concentrate of dispersant within the system is within acceptable levels. However, if the dispersal member should be placed alongside a skimmer or jet where there is relatively slow water velocity, I can adjust dispersal member 10 by rotating the sleeve or